March 1, 1960        J. JOSEPH        2,926,827
AUTOMOBILE CLOTHES RACK
Filed Jan. 3, 1957
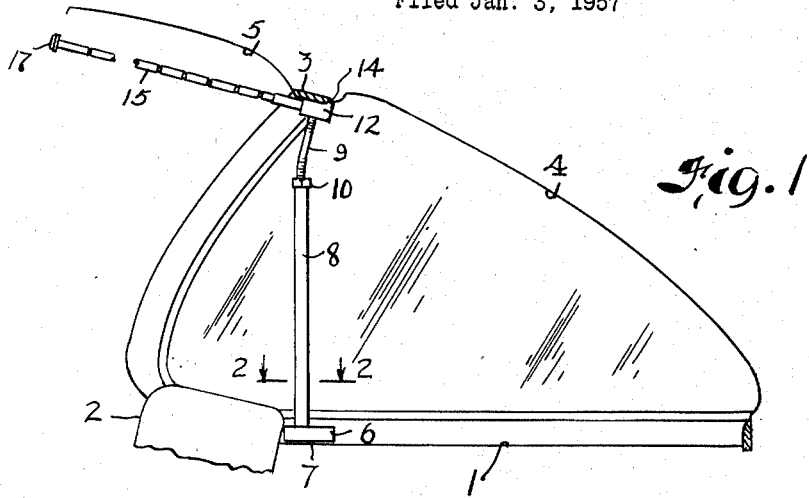
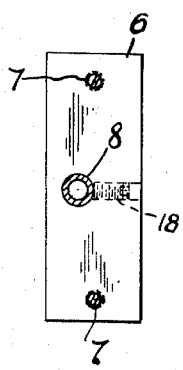
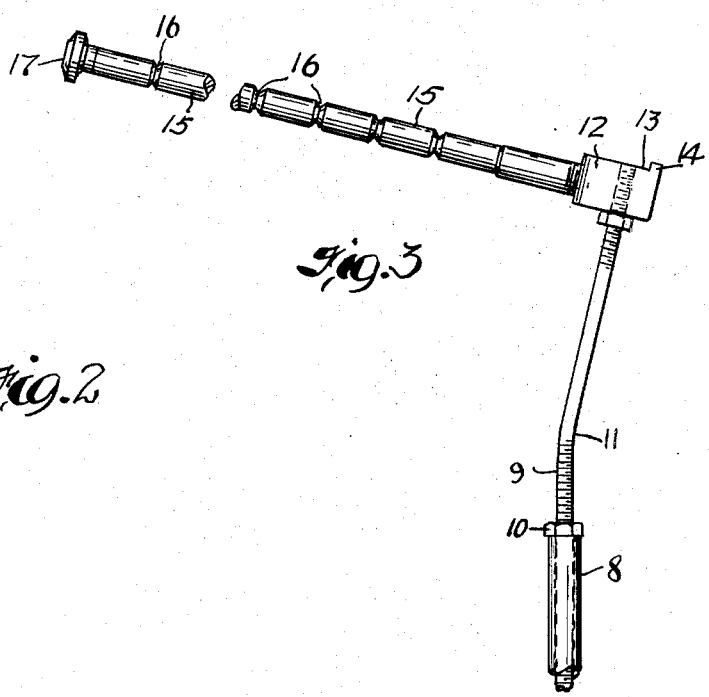
INVENTOR.
JAMES JOSEPH
BY
Oberlin + Limbach
ATTORNEYS.

2,926,827

AUTOMOBILE CLOTHES RACK

James Joseph, East Cleveland, Ohio

Application January 3, 1957, Serial No. 632,352

5 Claims. (Cl. 224—42.45)

This invention relates as indicated to automobile clothes racks and more particularly to such clothes racks which are mounted on the rear shelf of an automobile.

Many people when taking trips in an automobile wish to carry some of their clothing on clothes hangers rather than in suitcases in order to keep such clothing well pressed. When loose clothing of this sort is carried in an automobile merely by laying it on the back seat, it becomes disarranged while the automobile moves either because of rapid starts and stops of the car or because of many other factors. It is therefore desirable to hang loose clothing somewhere in the automobile and to hang it in such a way that they rest against each other in a neat pile and hence do not easily become disarranged.

It is therefore the principal object of my invention to provide a rack in an automobile on which clothes hangers can be hung and which rack will extend from the back shelf of the car so that the articles of clothing will hang therefrom and rest against each other in a pile draped over the back seat.

It is another important object of my invention to provide such a clothes rack which can be detachably mounted on the car and which will not necessitate the provision of permanent holes in the car.

It is another important object of my invention to provide such a detachable clothes rack which is easily installed and which is so constructed that it is rigidly supported in the car and will not slip loose from its mountings no matter how heavy a load of clothing is placed upon it.

It is a further object of my invention to provide such a clothes rack which when not in use can be left in the automobile and will not interfere with passengers sitting in the back seat.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative of but a few of the various ways in which the principle of the invention may be employed.

In the annexed drawings:

Fig. 1 is a side elevational view, somewhat schematic, illustrating a vertical section through an automobile with the clothes rack of my invention mounted on the rear shelf thereof;

Fig. 2 is a cross-sectional view of the apparatus in Fig. 1 taken on the line 2—2 in Fig. 1;

Fig. 3 is a detailed view on a larger scale illustrating the top portion of the rack illustrated in Fig. 1.

Referring now to the drawings in detail, the rack of my invention is mounted on the back shelf 1 of an automobile immediately adjacent to the back seat 2. The lower part of the rack rests against the back shelf 1 and the upper part rests against the conventional frame 3 which surrounds the rear window 4 of the automobile. It should be noted that the roof of the automobile, as is conventional practice in most American cars, extends upwardly and forwardly from the frame 3 as illustrated at 5.

My rack comprises a base plate 6 which rests on the rear shelf of the automobile and which contains two set screws 7 which can be screwed downwardly through the base plate to grip the rear shelf of the automobile and thus prevent the base plate from sliding laterally thereon. The bottoms of the set screws 7 may be provided with rubber tips to further insure that the base will not slip on the shelf, and similarly, a rubber pad may be provided on the bottom of the base plate 6. Mounted on the base plate 6 is a tubular shaft 8 which extends upwardly from the base 6 and is normal thereto. Telescopically mounted in the relatively rigid shaft 8 is a threaded more flexible rod 9 which carries thereon a nut 10 which is rotated to move rod 9 axially with respect to shaft 8. The part of the rod 9 above the shaft 8 is provided with a bend 11 therein. A head 12 is rigidly mounted on the top of the rod 9 with a top flat surface 13 thereon which lies at an oblique angle to the axes of the shaft 8 and the threaded portion of the rod 9. An upwardly extending flange 14 is provided on the lowest side of the surface 13, and the clothes supporting rod 15 extends from the head 12 from the side thereof remote from the flange 14. A plurality of circumferentially extending grooves 16 are provided in the rod 15 to prevent hangers from slipping thereon, and a generally disc shaped knob 17 is provided on the free end of the rod 15 to prevent clothes hangers from sliding off of the rod when the automobile comes to a sudden stop. This knob also prevents passengers in the rear seat of the car from cutting their heads on the sharp end of the rod 15.

It should be noted that it is desirable to mount the shaft 8 securely in the base plate 6 so that it will not extend through the bottom of the plate and puncture the shelf 1, the base plate being provided to distribute vertical forces over a greater area. This may be accomplished by welding the shaft 8 to the base plate 6, by plugging the bottom of the hole in the plate 6 in which the shaft 8 is mounted, or by the provision of the set screw 18 illustrated in Fig. 2.

As illustrated in Fig. 1 this rack of my invention is mounted on the rear shelf by rotating the nut 10 to extend the telescoped shaft 8 and 9 thereby forcing the flat surface 13 of the head 12 against the window frame 3. Since the force exerted on the head 12 by the rod 9 is parallel to the axis of the threaded portion of the rod 9 and is hence at an oblique angle to the flat surface 13, the head 12 will move until the flange 14 contacts the frame 3. This arrangement ensures that when the rack is installed it will seat properly against the window frame 3 so that it is rigidly mounted in the car.

It should be noted that the flat surface 13 on the head 12, at least the portion thereof which contacts the window frame 3, lies wholly on one side of the axis of the shaft 8, and the rod 15 lies on the other side of such axis. This feature adds a great deal of stability to my rack in that when a force is applied vertically downwardly on the rod 15 by any clothes hung thereon, the rod 15 and the head 12 tend to rotate around the point where the flange 14 contacts the window frame 3, and since this point of contact between the flange and the frame lies on the side of the base plate 6 remote from the rod 15 the forces exerted between the base plate 6 and the shelf 1 are predominantly vertical forces rather than horizontal forces which would tend to pull the plate 6 to the right in Fig. 1 if the head 12 contacted the frame 3 directly above the base plate 6.

It should also be noted that the rod 15 extends into the automobile from the head 11 at an angle extending upwardly and forwardly in a plane closely adjacent to and generally parallel to the roof of the car. This feature of my invention has two distinct advantages; any clothes hangers which tend to slide on the rod 15 will slide toward the head 12 at which point they will not be able to slide off the rod, and secondly, this characteristic of my invention places the clothes supporting rod well up toward the roof of the car so that when it is not in use it does not interfere with the head room of passengers sitting in the back seat.

My new rack can be mounted on the rear shelf of any automobile without permanently damaging the car by drilling holes in it, and the rack supports a large pile of clothes draped over the back seat of the car in a compact pile which prevents them from becoming disarranged. Furthermore, the fact that the clothes are draped over the seat of the car further stabilizes the rack since friction between the clothes and the seat prevents the rack from swaying sideways.

One of the most important features of my rack is the fact that its mounting positively prevents it from flying forward into the car should the car be involved in a collision. Thus, it will be seen that the base plate 6 is located behind the top of the rear seat, and the flange 14 on the head 12 is located behind the frame 3 surrounding the window 4. When the front of the car strikes some object, the rack is positively held in place by the back seat and the window frame so that it cannot move forward into the car, and the clothes are held on the rod 15 by the knob 17 so that they cannot fly forward. As a result, the danger of injuries to passengers from loose objects in the car is eliminated.

Other modes of applying the principle of the invention may be employed, change being made as regards the details described, provided the features stated in any of the following claims, or the equivalent of such, be employed.

I therefore particularly point out and distinctly claim as my invention:

1. A clothes rack to be mounted on the rear shelf of an automobile in which a frame in said automobile surrounds a window above said rear shelf and the roof of said automobile extends forwardly and upwardly from said frame comprising a base plate for engagement with the rear shelf of the automobile, a set screw in said plate operative to extend from the bottom thereof to grip only the top surface of said shelf, a tubular shaft extending upwardly from said base plate normal thereto, a threaded rod telescopically engaging said shaft and carrying thereon a nut operative upon rotation to move said rod axially with respect to said shaft, the top of said rod being rearwardly inclined, a head mounted on top of said rod and having a flat surface on the top thereof which is positioned to contact said frame and which lies wholly on one side of the axis of said shaft, said flat surface being inclined with respect to said axis and having its lowest edge remote from said axis, an upwardly extending flange on said head on the side thereof remote from the axis of said shaft, a clothes supporting rod connected to said head on the side thereof remote from said flange and extending in a direction upwardly divergent from said threaded rod so that said clothes supporting rod will lie in a plane generally parallel and closely adjacent to the roof of said automobile, and a plurality of circumferentially extending grooves in said rod.

2. A clothes rack to be mounted on the rear shelf of an automobile in which a frame in said automobile surrounds a window above said rear shelf and the roof of said automobile extends forwardly and upwardly from said frame comprising a base plate for engagement with the rear shelf of the automobile, a set screw in said plate operative to extend from the bottom thereof to grip only the top surface of said shelf, a tubular shaft extending upwardly from said base plate normal thereto, a threaded rod telescopically engaging said shaft and carrying thereon a nut operative upon rotation to move said rod axially with respect to said shaft, the top of said rod being rearwardly inclined, a head mounted on top of said rod and having a flat surface on the top thereof which is positioned to contact said frame and which lies wholly on one side of the axis of said shaft, an upwardly extending flange on said head on the side thereof remote from the axis of said shaft, a clothes supporting rod connected to said head on the side thereof remote from said flange and extending in a direction upwardly divergent from said threaded rod so that said clothes supporting rod will lie in a plane generally parallel and closely adjacent to the roof of said automobile, and a plurality of circumferentially extending grooves in such rod.

3. A clothes rack to be mounted on the rear shelf of an automobile in which a frame in said automobile surrounds a window above said rear shelf, comprising a base plate for engagement with the rear shelf of the automobile, a tubular shaft extending upwardly from said base plate, a threaded rod telescopically engaging said shaft and carrying thereon a nut operative upon rotation to move said rod axially with respect to said shaft, the top of said rod being rearwardly inclined, a head mounted on top of said rod and having a surface on the top thereof which is positioned to contact said frame and which lies on one side of the axis of said shaft, an upwardly extending flange on said head on the side thereof remote from the axis of said shaft, and a clothes supporting rod connected to said head on the side thereof remote from said flange and extending on the opposite side of said shaft from said head.

4. A clothes rack adapted to be mounted on an automobile having a forwardly sloping rear window, a frame for said window and a generally horizontal shelf in front of said window disposed generally below the upper portion of said frame; comprising an adjustably vertically extensible column adapted to be interposed between said shelf and the upper portion of said frame and extended tightly to brace the same therebetween, said column including a lower hollow relatively rigid shaft portion adapted to be positioned generally normal to said horizontal shelf and an upper thinner more flexible rod portion, said upper rod including a lower threaded portion extending within said shaft portion and an upper rearwardly inclined portion, means on said lower threaded portion adapted to move said rod portion with respect to said hollow shaft portion, a head mounted on the upper end of said upper rearwardly inclined portion of said rod, a protuberance on the rear of said head adapted to engage behind the upper portion of such frame on the rear side thereof, and a forwardly projecting garment holder extending from said head and positioned generally normal to the upper inclined portion of said rod whereby vertical downward forces on said garment holder transmit predominantly vertical forces from said upper more flexible rod portion to the lower relatively rigid shaft portion to stabilize the clothes rack under heavy loads.

5. The clothes rack of claim 4 wherein said lower hollow shaft portion is mounted in a base plate thereby to grip such horizontal shelf to distribute vertical forces on said rod over an enlarged shelf area.

References Cited in the file of this patent

UNITED STATES PATENTS

| | | |
|---|---|---|
| 2,516,617 | Couthlin | July 25, 1950 |
| 2,526,095 | Storey | Oct. 17, 1950 |
| 2,549,712 | Schwartz | Apr. 17, 1951 |
| 2,708,062 | Poyer | May 10, 1955 |
| 2,728,503 | Kramer | Dec. 27, 1955 |
| 2,764,332 | Lemley | Sept. 25, 1956 |